United States Patent [19]
Bauman et al.

[11] Patent Number: 5,921,556
[45] Date of Patent: *Jul. 13, 1999

[54] SEAL FOR GAS SPRINGS AND THE LIKE

[75] Inventors: Walter Douglas Bauman, Myrtle Beach, S.C.; James B. Chamberlin, Charlotte, N.C.; Jack R. Roach; Mark S. Jeffries, both of Florence, S.C.

[73] Assignee: AVM, Inc., Marion, S.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/730,225

[22] Filed: Oct. 15, 1996

Related U.S. Application Data

[63] Continuation-in-part of application No. 08/726,124, Oct. 4, 1996, and application No. 08/720,954, Oct. 4, 1996.

[51] Int. Cl.⁶ .............................. F16J 15/32; F16J 15/56
[52] U.S. Cl. .................. 277/560; 277/566; 277/568; 277/584
[58] Field of Search ............................. 277/176, 188 R, 277/188 A, 198, 199, 207 R, 208, 209, 211; 267/64.11; 188/322.17

[56] References Cited

U.S. PATENT DOCUMENTS

| | | | |
|---|---|---|---|
| 2,909,398 | 10/1959 | Taylor | 277/209 |
| 2,918,336 | 12/1959 | Works et al. | 277/188 R |
| 3,052,478 | 9/1962 | Horvereid | 277/209 |
| 3,319,661 | 5/1967 | Shindler | 277/188 R |
| 3,472,523 | 10/1969 | Rentschler et al. | 277/209 |
| 3,521,893 | 7/1970 | Josephson | 277/188 A |
| 4,089,534 | 5/1978 | Litherland | 277/198 |
| 4,576,386 | 3/1986 | Benson et al. | 277/188 A |
| 4,921,225 | 5/1990 | Ludwig | 188/322.17 |
| 4,946,143 | 8/1990 | Bauer et al. | 188/322.17 |
| 5,346,230 | 9/1994 | Schumacher et al. | 277/188 R |

FOREIGN PATENT DOCUMENTS

| | | | |
|---|---|---|---|
| 1288665 | 9/1972 | United Kingdom | 277/188 A |
| 1409266 | 10/1975 | United Kingdom | 277/188 A |

*Primary Examiner*—Anthony Knight
*Assistant Examiner*—John L. Beres
*Attorney, Agent, or Firm*—McAndrews, Held & Malloy, Ltd.

[57] ABSTRACT

A seal that is particularly suitable for use in a gas spring and other high pressure hydraulic and pneumatic sealing applications and that minimizes the leakage of relatively high pressure gas and lubricating oil from the rod end of the gas spring or the other applications. The generally annular seal body includes radially inwardly and outwardly facing surfaces and non-concave axial facing surfaces. Lobes for sealing, wiping and directing enhanced forces project radially beyond the planes of the radially inwardly and outwardly facing surfaces. The seal also includes a wiper insert that has a parabolic shaped radially outwardly facing surface and a radially inwardly facing surface, and that is secured in a recess adjacent to the front corner of the seal body's radially inwardly facing surface. When the seal body is compressed for use, the compression induced stresses in the seal body result in the formation of an effective gas and oil seal because, in part, one of the corners of the insert's radially inwardly facing surface is forced against the adjacent surface of the piston rod.

55 Claims, 3 Drawing Sheets

SEAL FOR GAS SPRINGS AND THE LIKE

CROSS REFERENCE TO RELATED APPLICATIONS

This is a continuation in part of U.S. application Ser. No. 08/726,124, filed Oct. 4, 1996 and U.S. application Ser. No. 08/720,954, filed Oct. 4, 1996. Each of the foregoing applications is hereby incorporated by reference herein in its entirety to provide continuity of disclosure.

BACKGROUND OF THE INVENTION

The present invention relates to gas and oil seals that are particularly adapted for use in gas springs and in other high pressure hydraulic and pneumatic sealing applications (hereinafter collectively referred to as "gas springs"). More specifically, the seal of the present invention advantageously minimizes the leakage of relatively high pressure gas and lubricating oil between an annularly spaced, axially relatively movable cylinder and piston rod, and hence, from the rod end of the cylinder.

The basic structure and theory of operation of gas springs has long been known. Gas springs include a piston and a cylinder, both having a relatively small diameter, usually under two inches. The piston is designed to move relatively within and with respect to the cylinder and is connected with one end of a piston rod that extends out of the normally sealed, rod end of the cylinder. The other end of the piston rod is usually connected with a device upon which the gas spring exerts force when the spring is actuated. The other, closed end of the cylinder is charged with a relatively high pressured gas, generally nitrogen, and usually at a pressure usually between 500–3,000 psi. Lubricating oil is normally also introduced into the closed end of the cylinder at the time of the gas spring's manufacture.

To be commercially acceptable, it has long been recognized by those in the gas spring art that a gas spring must include a seal that minimizes the leakage of the high pressure gas—and in most instances, the lubricating oil—from the rod end of the cylinder. This gas spring seal must effectively seal around the piston rod as well as between the piston rod and the cylinder, or more specifically the inner cylinder wall.

For this purpose, currently available gas springs generally use so-called "lip" seals or so-called "quad" seals. Examples of such quad seals are disclosed in U.S. Pat. Nos. 3,550,990 and 4,693,343. Such quad seals are normally employed in combination with a metal bushing member and a plastic, usually polytetrafluroethane ("PTFE"), washer. The washer is used to prevent the extrusion of the seal as disclosed in the latter patent.

Over the past decade or so, gas springs have been increasingly used in automotive vehicles in lieu of mechanical springs. For example, gas springs are now commonly used to hold open trunk hoods, deck lids, hatch doors (in hatch back type vehicles) and the rear doors or gates of minivans and sport utility vehicles.

The design and manufacture of gas springs for automotive usages pose unique, special problems for gas springs manufacturers, particularly in view of the large numbers of gas springs that must be manufactured to exacting specifications by mass production techniques and machinery. Additionally, and increasingly within the past several years, enormous pressures have been exerted by automotive manufacturers to have gas spring manufacturers reduce their manufacturing costs while, at the same time, enhance the quality of their gas springs.

One of the problems confronting gas spring manufacturers is the range of environmental conditions under which the gas springs are used and their sometimes irregular usage. For instance, gas springs are expected to function satisfactorily in the heat of summer and in the cold of winter even when, for example, a trunk hood may be opened by an elderly person who only infrequently uses his or her vehicle.

To enable gas springs to function as intended in an automotive environment, the gas pressure of the spring (that is, the output force exerted by the spring) must be maintained substantially constant throughout the anticipated life of the gas spring. It is imperative then that leakage of gas from the gas spring cylinder be minimized, both when the gas spring is being used, that is, when it is in a dynamic state or mode, and when it is not being used, that is, when it is static. No one is "happy" when a trunk lid fails to remain in its open position even if the vehicle is over five years old.

Leakage of the lubricating oil from the gas springs cylinders has also been becoming an increasingly serious problem as gas springs are more often used in passenger occupying parts of vehicles, such as vans and hatch backs. No one likes to find oil "spots" in their vehicles, particularly when the spots are where children or pets are likely to be. Acceptable gas spring seals must now minimize both dynamic and static oil losses. only a decade or so ago, the standards for gas springs, set by automotive manufacturers, were losses of less than a 5% output force/gas charge and 3.0 cc. oil per 10,000 cycles. Losses of less than a 5% output force/gas charge and 0.3 cc. oil per 50,000 cycles are now the targeted standards. Automotive manufacturer would like in the future to extend the standards to 100,000 cycles as the life expectancy of automotive vehicles and their components is extended.

Another problem long facing gas spring manufacturers is the reduction of the high static frictional ("stiction") or break-a-way force, that is, the force required to "unstick" the seal when the initial relative movement between the cylinder and the piston rod occurs. This problem is significant in gas springs and hydraulic/pneumatic suspension applications where it is important to minimize high initializing force spikes and resulting seal instability due to long delays between cycles. Such delays are especially common in gas springs employed in automotive vehicles.

Further, dynamic friction may contribute to accelerated seal failures during high frequency low amplitude cycling (typically 3 mm×20 Hz). This is associated with "gate dance" which occurs when the vehicle encounters irregular road surface conditions.

Those skilled in the gas spring art have recognized that currently available gas spring seals, and even the better performing quad seals, have inherent weakness or limitations. For instance, the current, commercially available seals remain prone to relatively high static and dynamic oil losses and has high "stiction" or static break-a-way forces. It has been a longstanding goal in this art to overcome these weaknesses, to extend the cycle life for effective gas spring seals, and to reduce significantly the cost of manufacturing gas springs even further.

BRIEF SUMMARY OF THE INVENTION

In principal aspects, the gas spring seal of the present invention employs a unique materially hybrid, non-symmetrical energized seal body and "wiper" insert design that controls the distinct sealing requirements of high pressure gas and oil in a novel manner and that minimizes the dynamic leakage of the gas and oil out of the gas spring cylinder to a much greater extent than current, commercially available seals. More specifically, the improved seal of the present invention performs beyond the currently targeted standards of losses of less than 5% output force/gas charge and 0.3 cc oil per 50,000 cycles. Moreover, tests indicate that the improved seal advantageously reduces losses to less than 3.0 output force/gas charge per 100,000 cycles (where a 30.0% loss would be typical of current seals) and to less than 0.1 cc oil per 100,000 cycles (where a 10.0 cc loss per 100,000 cycles would be typical of current seals). Additionally, the improved seal is capable of reducing static friction ("stiction") or break-a-way forces to values approaching zero; of handling extreme pressure differentials exceeding 200 atmospheres; and of reducing friction and permeation leakage as compared to current seals.

Further, and as compared with rod end bushing assemblies which utilize current quad seals and PTFE washers as components, the improved seal of the present invention permits significant manufacturing and assembly economies. Since in some respects, the improved seal, in effect, integrally combines quad seal and PTFE washer concepts, the rod end seal and bushing component count, using the present inventive seal, is reduced by one-third. The wiper insert of the present invention is robust enough to permit it to be co-molded with the seal body. Consequently, certified cell automation and zero defect quality strategies may be utilized in manufacturing the improved seal. The design of the improved seal is also compatible with parametric scaling techniques that allow rapid and facile development of alternate ID/OD designs as market opportunities present themselves.

The improved seal of the present invention retains the fault tolerant redundance of prior quad seal designs, but now also includes geometrically optimized sealing surfaces that are able to bridge both rod and cylinder wall imperfections. The incorporation of the unique, integrated and energized wiper insert further prevents external contaminants (such as road grits and salts) from entering and compromising the gas spring system. Further the energizing design of the improved seal enables both the wiper insert and the seal body to replenish or "heal" damaged or worn areas.

Accordingly, it is a principal object of the present invention to provide an enhanced and improved gas spring and the like, which has an annularly spaced, relatively movable piston rod and cylinder, and which contains the relatively high pressured gas and lubricating oil by employing a novel and improved piston rod and cylinder seal so as to minimize the leakage of the gas and oil from the rod end of the gas spring.

Another object of the present invention is to provide an improved seal, as described, for gas springs and the like where the seal includes a non-symmetrical, generally annular seal body which is made of an elastomeric material, such as rubber, and which has a longitudinal axis generally parallel to the axis of relative movement of the rod and cylinder; where the seal body also has a first, inwardly facing surface which is adapted to be disposed about and in compression contact with the rod, a second, radially outwardly facing surface which is adapted to be disposed within and in compression contact with the cylinder, a third, axial facing surface which is adapted to be exposed to the relatively high gas pressure in the cylinder, and a fourth, axial facing surface which is adapted to be exposed to the relatively lower pressure, as for example, atmospheric pressure; where the seal body further has a first, generally annular sealing lobe at the intersection of its first and third surfaces, a second, generally annular sealing lobe at the intersection of its second and third surfaces, a third, generally annular enhanced force directing and sealing lobe at the intersection of its second and fourth surfaces, a fourth, generally annular enhanced force directing and sealing lobe in its second surface between the second sealing lobe and the third lobe, and a fifth, generally annular wiper and sealing lobe in the first surface approximately midway between the planes of the third and fourth axial facing surfaces; where the seal body still further has a generally annular recess opening in the first surface, adjacent to the "intersection" of the planes of the first and fourth surfaces and adjacent to the fifth lobe; and where a generally annular wiper insert, which is made of a relatively flowable plastic, such as PTFE, and which is disposed in the recess, has a radially outwardly facing surface which is generally convex, preferably parabolic, in cross-sectional shape, has a first axially facing surface, has a radially inwardly facing surface and has a radially inwardly disposed first corner edge which is defined by the intersection of the planes of the first axial facing surface and the inwardly facing surface of the insert and which is disposed radially inwardly beyond the plane of the first surface; and where the size and shape of the seal body are such that when the seal is disposed for sealing between the rod and cylinder, stress will be induced in the seal body, primarily from its compression between the cylinder and rod and from gas loading, whereby the leakage of gas between the body and the cylinder and between the body and rod will be minimized because, in part, the resultant compression forces will tend to rotate the insert, with respect to the surface of rod, such that the first corner edge of the insert will bear against the adjacent surface of a rod so as to minimize the leakage of oil between the first corner edge and the rod. A related object of the present invention is to provide an improved seal, as described, where the first corner edge of the insert is adjacent to the fifth lobe; and where unstressed, the third and fourth surfaces are generally non-concave and are generally perpendicular to the longitudinal axis.

Still another object of the present invention is to provide an improved seal, as described, for gas springs and the like where when unstressed, the first and second sealing lobes are generally convex in cross-sectional shape; where the fourth lobe is generally convex in cross-sectional shape, when unstressed; where when unstressed, the fifth lobe is generally convex in cross-sectional shape, although truncated in part in one axial direction; where the truncated part of the fifth lobe is adjacent to the first sealing lobe; and where when unstressed, the third lobe is generally convex in cross-sectional shape, although having an extended central portion. A related object of the present invention is to provide an improved seal, as described, where the radii of the first and second sealing lobes are generally the same; where the radius of the fourth sealing lobe is approximately twice that of the radii of the first and second sealing lobes, and where the axial length of the central portion of the third lobe is approximately the length of the radii of the first and second sealing lobe.

A further object of the present invention is to provide an improved seal, as described, for gas springs and the like, where the seal body has a generally annular relief cavity opening in the first surface, between the insert and the fifth lobe; where the relief cavity continues, as a defined cavity, when the seal is stressed due to its in-use disposition, under compression, between the cylinder and the rod; where the first corner edge of the insert is adjacent to the relief cavity; and where when the seal is in use, the stress induced in the seal body, due to the compression exerted on the seal body by the cylinder and rod is relatively high as compared to the stress induced in the seal body, due to the relative radial dimensions between the first surface and the rod.

Yet another object of the present invention is to provide an improved seal, as described, for gas springs and the like, where the insert includes a second axial facing surface that is adjacent to, but spaced from the plane of the unstressed fourth axial surface of the seal body by a preselected axial distance; where the intersection of the planes of the first axial facing surface and the inwardly facing surface of the insert defines a second corner edge of the insert; where the fourth surface extends radially inwardly, from the second surface, a preselected radial distance that is less than the radial distance between the second surface and the second corner edge such that the second corner edge and at least a portion of the second axial surface of the insert are exposed; and where when the seal body is unstressed, the plane of the inwardly facing surface of the insert is sloped with respect to the longitudinal axis.

Further advantages, objects, and benefits of the present invention will become apparent from the following description of the preferred embodiment of the present invention, made in connection with the drawings described below.

DETAILED DESCRIPTION OF THE INVENTION

Figure 1:
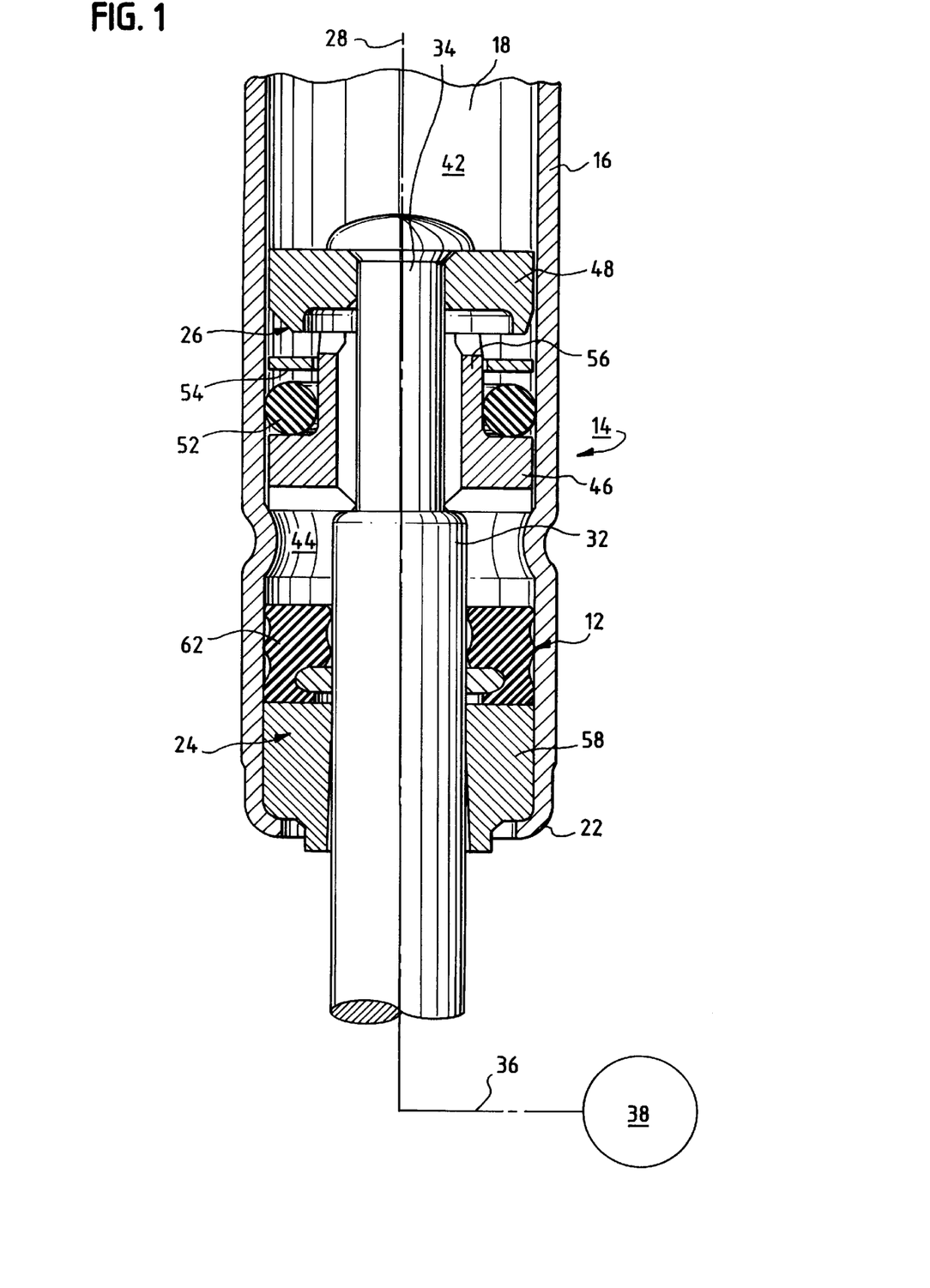
FIG. 1 is a partial, axial cross-sectional view of a gas spring, with parts thereof broken away, showing an improved seal of the present invention disposed, for illustrative purposes in an unstressed state, in the gas spring.

Referring now to FIG. 1, a preferred embodiment of the improved seal 12 of the present invention is illustrated as it is disposed, in an uncompressed state, in a gas spring 14. Except for the seal 12, the spring 14 is otherwise of conventional design and construction.

More specifically, the gas spring 14 includes a cylinder 16 that has a closed end 18 and a rod end 22. A bushing and seal assembly 24 normally closes the rod end 22.

A piston assembly 26 is disposed within the cylinder 16 and is adapted to move relatively, with respect to the cylinder 16, along a longitudinal axis of movement 28, which is coaxial with the longitudinal axes of the cylinder and the piston assembly. A piston rod 32 is connected, in a conventional manner, at its reduced diameter end 34, with the piston assembly 26. The longitudinal axis of the rod 32 is also co-axial with the axis 28.

The piston rod 32 extends through the bushing and seal assembly 24 and out of the rod end 22 of the cylinder 16. The rod's distal end 36 is connected with a conventional device, shown at 38, upon which the gas spring 14 exerts force when the gas spring is actuated. Examples of such a device 38 are a trunk or deck lid, a hood of an automobile, a hatch door of hatchback type vehicle, or a rear door or gate of a minivan or sport utility vehicle. When the gas spring 14 is used with such a device 38, the other end, not shown (that is, the end adjacent the closed end 18), of the gas spring 14 would be connected, through conventional means also not shown, with the body of the vehicle.

The interior of the cylinder 16 is divided, by the piston assembly 26, into a compression chamber 42 and an expansion chamber 44. These chambers 42 and 44 are charged, during the gas spring's manufacture, with a relatively high pressure gas, usually nitrogen. As is typical for gas springs, the gas pressure would be in the 500–3,000 psi range. An amount of lubricating oil is also introduced into the cylinder 16 during manufacture to facilitate relative movement between the piston assembly 26 and the cylinder 16.

The piston assembly 26 includes a first annular member 46, which is disposed adjacent to the expansion chamber 44, a second annular member 48, which is disposed adjacent to the compression chamber 42, a conventional O-ring 52, and a steel washer 54. The first member 46 includes a central, tubular extension 56 that extends toward the second member and that is spaced radially outwardly, from the adjacent, reduced diameter end 34 of the piston rod 32 so as to define an axial gas passage therebetween. The O-ring 52 and the washer 54 are mounted on and about the extension 56 for limited relative axial movement with respect to the extension 56. The O-ring 52 serves to prevent gas and oil from passing between the first member 46 and the cylinder 16. The distal end of the extension 56 and the second member 48 have a radial gas passage defined therebetween.

Gas in the cylinder 16 is permitted to flow between the outer periphery of the second member 48 and the cylinder 16, through the radial passage between the members 46 and 48, and through the axial passage between the extension of the first member 46 and the piston rod 32. As is conventional, when the gas spring 14 is in its dynamic mode or state, gas may pass, without restriction, from the compression chamber 42 to the expansion chamber 44 through the piston assembly 26 as the piston assembly moves relatively toward the closed end 18 of the cylinder 16. However, when the piston assembly 26 moves relatively toward the rod end 22 of the cylinder 16, the O-ring 52 and the washer 54 restrict the flow from the expansion chamber 44 to the compression chamber 42.

When the gas spring 14 is in a static mode or state, the gas in the chambers 42 and 44 will readily reach pressure equilibrium. The bushing and seal assembly 24 will be exposed to full gas pressure at all times and must satisfactorily seal against gas leakage at all times to maintain the effectiveness of the gas spring.

The oil in the cylinder 16 is distributed throughout the cylinder 16. Oil tends, however, to collect adjacent to the bushing and seal assembly 24, particularly when the gas spring is disposed generally vertically, that is, with its rod end 22 down. The pressure of the gas in the expansion chamber seeks to force the oil past the bushing and seal assembly 24.

As noted, the bushing and seal assembly 24 receives the reciprocally movable piston rod 32. The assembly 24 includes a conventional, annular metal (normally brass) bushing member 58 that tightly fits about the piston rod 32 when it reciprocally moves, with respect to the cylinder 16 (that is, when the gas spring is in its dynamic mode) and when the piston rod is not moving relative to the cylinder that is, when the gas spring is in its static mode).

The bushing and seal assembly 24 also includes the improved seal 12 of the present invention, which as noted, serves to minimize the leakage of gas and oil from the expansion chamber 44 out of the rod end 22 of the cylinder 16. As illustrated in FIG. 1, the seal 12 is disposed, normally in a compressed state, between the piston rod 32 and the cylinder 16 (or more particularly, between the inner facing surface of the wall of the cylinder).

Figure 2:
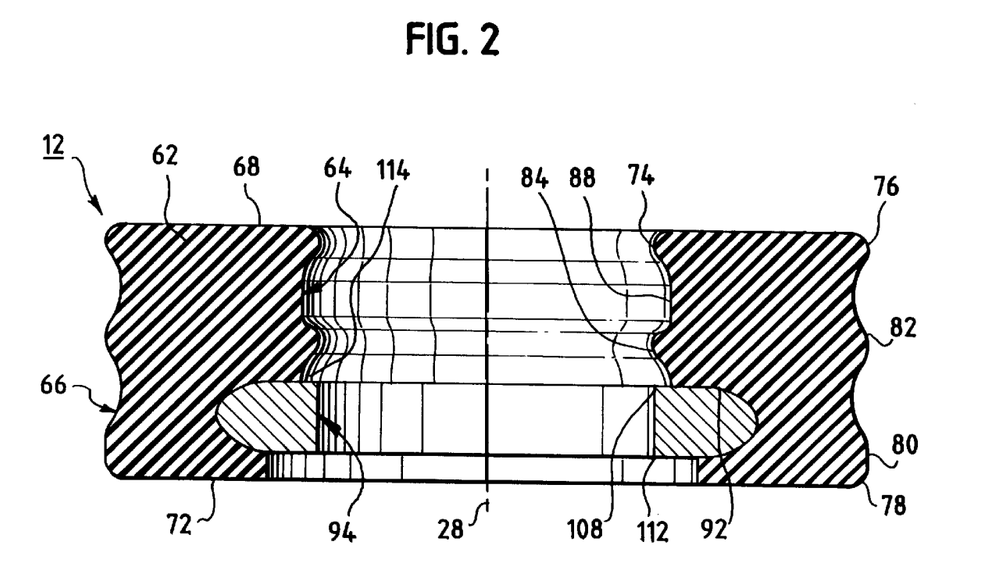
FIG. 2 is an axial cross-sectional view taken of an improved seal of the present invention.

Referring now to FIG. 2, the improved seal 12 includes a seal body 62 made from a conventional elastomeric material, such a rubber. The material may be the same as that used for prior quad gas spring seals. The durometer of the material should be between 60 and 90 depending on the particular application. Like the material used for other quad seals, the material used for the body 62 should have the ability to resist taking a compression set so as to avoid losing its installed pre-load. The tendency of the seal body 62 to be stretched to a relaxed state is overcome by establishing its installed pre-load by its OD to the cylinder's ID compression and not by relying upon tensile loading of its ID through stretching it onto the piston rod's OD. In other words, if the compression set qualities are acceptable, the installed pre-load or stress will remain stable for the life of the seal 12. An example of a material that may be used for the seal body 62 is Compound No. 558T marketed by Quadion Corporation, d/b/a Minnesota Rubber Co., of Minneapolis, Minn. although other compounds may also be used.

As best illustrated in FIG. 2, the body 62 has a radially inwardly facing surface 64, a radially outwardly facing 66, a first, rear, axial facing surface 68 and a second, front axial facing surface 72. The seal body 62 also includes several sealing lobes on its radially inwardly and outwardly facing surfaces 64 and 66. Specifically, a first, generally annular sealing lobe 74 is at the intersection of the inwardly facing surface 64 and the first axial surface 68. A second similar, generally annular sealing lobe 76 is at the intersection of the outwardly facing surface 66 and the axial surface 68. When unstressed (that is, when for example, the seal 12 is not compressed between the cylinder 16 and rod 32), both the sealing lobes 74 and 76 are generally convex in cross-sectional shape and both have radii of generally the same length.

A third, generally annular sealing lobe 78 is at the intersection of the outwardly facing surface 66 and the second axial facing surface 72. The lobe 78 is of a larger size and thus has more mass than the sealing lobes 74 or 76. This larger mass gives it enhanced forced directing characteristics when the seal 12 is deposed for use in a gas spring, that is, when the seal is compressed between the cylinder 16 and the rod 32. In cross-sectional shape, the enhanced force directing and sealing lobe 78 has curved axial end portions and an axially elongated central portion 80 whose axial length is approximately the length of the radii of the lobes 74 or 76.

A fourth, generally annular sealing lobe 82 is in the radially outwardly facing surface 66 approximately midway between the planes of the axial facing surfaces 68 and 72. Like the lobe 78, the lobe 82 is larger in size, and thus in mass, than the sealing lobes 74 and 76. This larger mass gives it enhanced force directing characteristics when the seal is disposed for use in a gas spring. Like the sealing lobes 74 and 78, the enhanced force directing and sealing lobe 82 is generally convex, in cross-section shape, when uncompressed or unstressed. The length of the radius of the lobe 82 is approximately twice that of the radii of the sealing lobes 74 and 76.

A fifth, generally annular sealing lobe 84 is in the radially inwardly facing surface 64 approximately midway between the planes of the axially facing surfaces 68 and 72. The lobe 84 is shaped so that when compressed or stressed as when the seal 12 is in use, it also performs a wiping function with respect to the surface of the rod 32. Specifically, the lobe 84 has a generally convex cross-sectional shape except that its end portion, adjacent or facing the sealing lobe 74, is truncated.

The portions of the outwardly facing surface 66 between the lobes 78 and 82 and between the lobes 82 and 76 are at least in part concave. These portions are shaped and located so as to assist in directing the compression induced forces as hereinafter described. Similarly, the portion 88 of the inwardly facing surface 64 between the lobes 74 and 84 is at least in part concave. In addition to assisting in directing the compression induced forces as described, the portion 88 is shaped so that when the seal 12 is in use (that is, when the seal is compressed between the cylinder 16 and rod 32), a column of oil builds and is retained in the portion 88 and between the seal body 62 and the rod 32. This column or pocket of retained oil minimizes friction and helps to virtually eliminate stiction.

The lobes 76, 78, and 82 project radially outwardly from an imaginary annular plane of the surface 66, which plane may be defined as containing the average radial dimension of the surface 66, considering the sealing lobes 76, 78, and 82 and the portions therebetween. The lobes 74 and 84 project radially inwardly from an imaginary annular plane of the surface 64, which plane may be defined as containing the average radial dimension of the surface 64, considering the sealing lobes 74 and 84 and the portion 88 therebetween.

As noted, the sealing lobes 74 and 76 are generally convex in cross-sectional shape. Testing has disclosed that preferably the sealing lobes 74 and 76 should preferably have the same radius (for their convex curvatures) and that that radii should be less than approximately 0.019 inches. In production, the radii of the sealing lobes may be reduced to a nominal 0.012 inch radius. When the radii of the sealing lobes exceeds 0.019 inches, tests indicate that some oil seepage may occur. Using sealing lobes having such radii assures adequate localized stress so as to shear oil from the OD of the piston rod 32 under both static and dynamic conditions.

Testing has also demonstrated that the first and second axial surfaces 68 and 72 should preferably be generally flat or slightly crowned, but not concave as in the prior quad seals. As such and when unstressed, the planes of the axial surfaces 68 and 72 are generally perpendicular to the seal's longitudinal axis 28, which as noted above, is co-axial with the longitudinal axis of the piston rod 32 and the cylinder 16.

In use, the rear axial surface 68 is intended to be exposed to the relatively high pressure gas and oil in the expansion chamber 44 of the cylinder 16. The front axial surface 72 is intended to be exposed to a much lower pressure, such as atmospheric pressure, when the seal 12 is employed in the gas spring 14.

A generally annular recess 92 opens in the inwardly facing surface 64 of the seal body 62 between the lobe 84 and the plane of the axial surface 72. As shown in FIG. 2, the front "edge" of the recess 92 (that is, the edge adjacent the surface 72) is preferably axially spaced, a preselected distance, from the plane of the unstressed axial surface 72.

Figure 3:
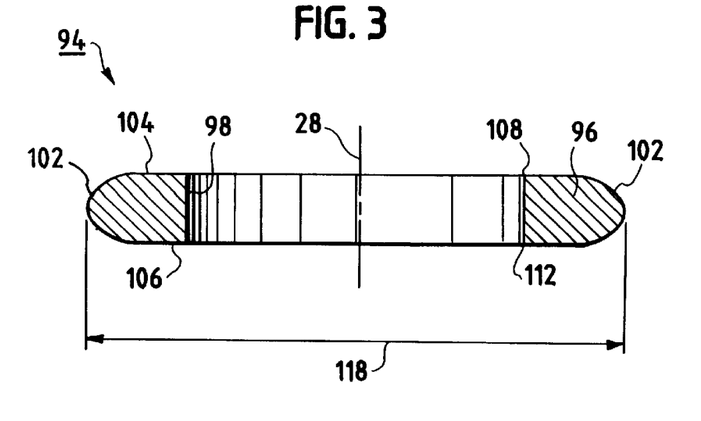
FIG. 3 is an axial cross-sectional view of the insert of the improved seal of the present invention.

A generally annular wiper insert 94 is received and secured within the recess 92, which as illustrated in FIGS. 2 and 3, conforms to the shape of the adjacent parts of the insert 94. The insert 94 may be advantageously co-molded with the seal body 62.

Referring to FIG. 3, the insert 94 includes a generally annular body 96 made from a relatively flowable plastic material, such as "PTFE". More specifically, the material could preferably be the PTFE polymer marketed by Hoechst Celanese Corporation of Somerville, N.J. or by E.I. DuPont de Nemours & Company of Wilmington, Del. under the "TEFLON" trademark.

The insert body 96 includes a generally radially inwardly facing surface 98, a generally radially outwardly facing surface 102, a first axial facing surface 104 and a second axial facing surface 106. The plane of the first axial surface 104 is adjacent or generally faces and is preferably parallel with the plane of the unstressed axial surface 68, as shown in FIG. 2. The second axial surface 106 is adjacent or generally faces the plane of the axial surface 72 and is preferably parallel with the plane of the unstressed axial surface 72.

The outwardly facing surface 102 has a generally convex cross-sectional shape and for the reasons hereafter discussed, its shape is preferably parabolic. The inwardly facing surface 98 is generally flat, in the axial direction. A "sharp" first corner edge 108 is defined on the insert 94 at and by the intersection of the surface 98 and the first axial facing surface 104. A second corner edge 112 is defined in the insert 94 at and by the intersection of the surface 98 and the second axial facing surface 106.

The inwardly facing surface 98 is sloped slightly so that the first corner edge 108 is disposed radially inwardly, with respect to the second corner edge 112, when the seal 12 is positioned for sealing in a gas spring. To facilitate the manufacture of the seal by co-molding techniques, the slope in the surface 98 may be formed during the molding operation by conventional tooling.

As illustrated in FIG. 2, a part of the axial facing surface 72 of the seal body 62 (that is, the radially inward portion of the seal body adjacent the axial facing surface 106 of the insert 94) is partially "cut away". More specifically, the surface 72 extends radially inwardly, from the plane of the outwardly facing surface 66, a preselected radial distance which is less than the radial distance between the plane of the surface 66 and the second corner edge 112 of the insert 94. Hence, the second corner edge 112 and a radially inward portion of the axial facing surface 106 of the insert 94 are exposed. This "cut-away" construction avoids extrusion of the surface 72 (and particularly the radially inward portion of it) into the bushing 58 of the bushing and seal assembly 24. Additionally, the "cut-away" construction facilitates the sealing action of the insert 94 as hereinafter explained.

As best shown in FIG. 2, a generally annular relief cavity 114 in the seal body 62 opens in the inwardly facing surface 64 between the lobe 84 and the axial facing surface 104. The relief cavity 114 is radially "deeper" than the portion 88 of the surface 64 between the lobes 74 and 84 such that it continues as a defined cavity even when the seal body 62 is compressed and stressed, due to the seal's in-use deposition, under compression, between the cylinder 16 and the rod 32. Besides maintaining a reservoir of oil, which like the portion 88, minimizes friction and tends to virtually eliminate stiction, the relief cavity 114 also "catches" and retains contaminants that may be able to get between the seal 12 and the rod 32.

The radial dimension of the surface 66 of the seal body 62 is greater than the radial dimension of the radial inwardly facing surface (which is adjacent to the seal body 62) of the cylinder 16, and the radial dimension of the surface 64 of the seal body 62 is less than the radial dimension of the radially outwardly facing surface (which is adjacent to the seal body 62) of the piston rod 32. More specifically, and in other words, the OD of the seal body 62 is selected, vis-a-vis the cylinder 16 in which the seal 12 will be disposed, so that ID of the cylinder is less than the OD of the seal body. When the seal 12 is properly positioned between the rod 32 and cylinder 16, the seal body 62 is compressed between the cylinder and the rod. This compression induces stress, sometimes called installed stress, in the seal body 62. The ID of the seal body 62 is selected so that it is slightly smaller than the OD of the piston rod 32, but the interference or overlap between this OD and ID is relatively minimal so that most of the installed stress induced in the seal body 62 (due to its being disposed between the cylinder and the rod) is caused by the compression of the seal between the cylinder and the rod.

As the seal 12 becomes loaded, both by the installed stress and by the differential pressures acting on its axial surfaces 68 and 72 (that is, by gas loading), the relative interference loads increase differentially as a result of the seal geometries and the properties of the seal body material. That is, tests have shown that there is a high stress loading at and about the lobe 84 and that a resultant force vector is created in the front end of the seal body 62. This force vector extends inwardly from the area of the lobe 78 (in a somewhat generally radial direction) and acts on the outwardly facing parabolic surface 102, and more particularly, on that portion of the surface 102 facing the lobe 84. As a result, the insert 94 tends to be rotated about the centroid of its parabolic surface 102 such that the first corner edge 108 of the insert 94 is forced tightly against the adjacent OD surface of the rod 32. This serves to wipe oil from the OD of the rod 32, and hence, to minimize the seepage or leakage of the oil past the inwardly facing surface 98 of the insert 94. The parabolic shape of the surface 102 allows a smooth stress translation.

That is not to say, however, that the sealing lobes 74, 76, 78, 82, and 84 do not also prevent leakage of oil from the cylinder 16—as well as preventing the leakage of the high pressure gas. Rather it is the synergistic combination of the wiping action of the corner 108 of the insert 94, taken together with the stressed sealing between the lobes 74 and 84 and the OD of the piston rod 32 and between the lobes 76, 78 and 82 the ID of the cylinder, that creates the extremely effective seal of the present invention. Additionally, the increased mass of the lobes 78 and 82 not only serves to maintain the installed stress of the seal body 62 longer, but also serves to continue to "feed" PTFE material, at the corner edge 108, against the OD surface of the rod 32 as the corner edge wears away.

Figure 4:
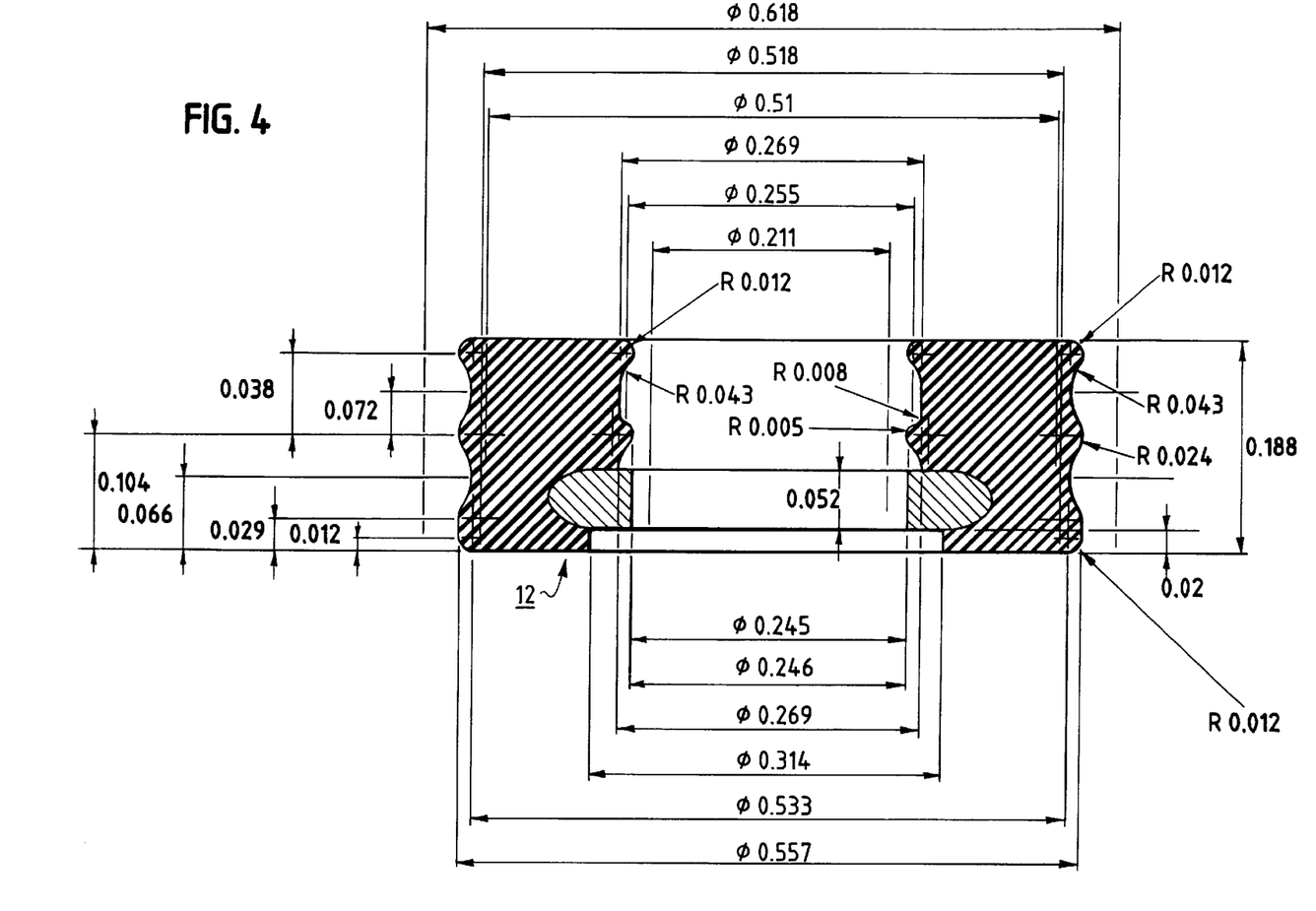
FIG. 4 is a cross-section view, similar to FIG. 3, showing illustrative dimensions of an example of the improved seal.

As an example, FIG. 4 discloses illustrative dimensions, in inches, of an embodiment of the seal 12. Additionally, the diametrical dimension of the insert 94 from surface 102 to surface 102 (shown at 118 in FIG. 3) is 0.396/0.393 inches.

In sum, the design (geometry) of the seal 12, and of its component lobes and surfaces, as described hereinabove, are such that upon the loading of the seal 12 (that is, when the seal 12 is compressed between the cylinder 16 and the rod 32 and when the gas spring 14 is charged by the introduction of gas under pressure within the chambers 42 and 44), effective static and dynamic gas and oil seals will be formed between the seal 12 and the cylinder 16 and between the seal 12 and rod 32. Tests and analyses indicate that the seal's effectiveness, particularly with respect to preventing leakage of oil and gas along the rod 32, results because the loading of the seal 12 forces the sharp corner edge 108 of the inwardly facing surface 98 of the insert 94 against the adjacent OD surface of the rod 32. More specifically, the loading of the seal 12 causes a resultant force vector to act upon the parabolic surface 102 of the insert 94 so as to urge the corner 108 against and into sealing contact with the OD of the rod 32.

Although it will be apparent to those working in the art to which this invention pertains that changes may be made in the above described embodiment of the invention, without departing from the scope of the invention, it is intended that the above description and drawings of the preferred embodiment be interpreted as illustrative and not in a limiting sense.

We claim:

1. An improved seal adapted to prevent leakage of relatively high pressure gas and lubricating oil between a first inner member and a second outer member, which members are annularly spaced and are relatively movable with respect to each other, the improved seal comprising:

a generally annular seal body that is made of an elastomeric material, that has a longitudinal axis and that includes a first, radially inwardly facing surface; a second, radially outwardly facing surface; a third, axial surface; and a fourth, axial surface, with the third and fourth surfaces being non-concave when unstressed;

the seal body having a first, generally annular sealing lobe at the intersection of the first and third surfaces; a second, generally annular sealing lobe at the intersection of the second and third surfaces; a third, generally annular, enhanced force directing and sealing lobe at the intersection of the second and fourth surfaces; a fourth, generally annular, enhanced force directing and sealing lobe in the second surface between the second sealing lobe and the third lobe; and a fifth, generally annular, wiper and sealing lobe in the first surface approximately midway between the planes of the third and fourth axial surfaces, with the first sealing lobe and the fifth lobe projecting radially inwardly; with the second sealing lobe, the third lobe and the fourth lobe projecting radially outwardly, with the first sealing lobe, the second sealing lobe and the fourth lobe being generally convex in cross-sectional shape, when unstressed; with the third lobe being generally convex in cross-sectional shape, although having an axially extended central portion, when unstressed; with the fifth lobe being generally convex in a cross-sectional shape, although truncated in part in one axial direction, when unstressed; with the second surface, between the second sealing lobe and the fourth lobe and between the fourth lobe and the third lobe, being generally, at least in part, concave, when unstressed; and with the first surface, between the first sealing lobe and the fifth lobe, being generally at least in part concave when unstressed;

the seal body also having a generally annular recess opening in the first surface between the fifth lobe and the intersection of the planes of the first surface and the fourth surface; and a relatively flowable plastic, generally annular insert disposed in the recess, with the insert having an radially outwardly facing surface, which is generally convex in cross-sectional shape, having a first axial facing surface, having a first radially inwardly facing surface, and having a first corner edge, which is defined by the intersection of the planes of the first axial facing surface and the inwardly facing surface and which projects radially inwardly.

2. The improved seal of claim 1 wherein the insert is made of PTFE material; and wherein the seal body is made of rubber.

3. The improved seal of claim 1 wherein the radii of the first and second sealing lobes are generally the same; wherein the radius of the fourth lobe is approximately twice that of the radii of the first and second sealing lobes; and wherein the axial length of the central portion of the third lobe is approximately the length of the radii of the first and second sealing lobes.

4. The improved seal of claim 3 wherein when unstressed, the third and fourth surfaces are generally perpendicular to the seal axis; and wherein the radii of the first and second sealing lobes are equal to or less than approximately 0.019 inches.

5. The improved seal of claim 1 wherein the truncated part of the fifth lobe faces the first sealing lobe; and wherein when the seal is unstressed, the plane of the inwardly facing surface of the insert is sloped with respect to the longitudinal axis.

6. The improved seal of claim 1 wherein the seal body has a generally annular relief cavity opening in the first surface between the insert and the fifth lobe.

7. The improved seal of claim 6 wherein the relief cavity continues as a defined cavity when the seal is stressed due to the in-use disposition of the seal; and wherein the first corner edge of the insert is adjacent to the relief cavity.

8. The improved seal of claim 1 wherein the first surface of the seal body is adapted to be disposed about and in sealing contact with radially outwardly facing surface of the first member; wherein the second surface of the seal body is adapted to be disposed within and in sealing contact with a radially inwardly facing surface of the second member; wherein the radial dimension of the first surface of the seal body is less than the radial dimension of the radially outwardly facing surface of the first member and the radial dimension of the second surface of the seal body is greater than the radial dimension of the radially inwardly facing surface of the second member; and wherein the radial dimensions of the first and second surfaces of the seal body are selected so that when the seal is disposed between the radially outwardly facing surface of the first member and the radially inwardly facing surface of the second member, the induced forces in the seal body are mostly caused by the compression of the seal body between the first and second members.

9. The improved seal of claim 1 wherein the outwardly facing surface of the insert is parabolic in cross-sectional shape.

10. The improved seal of claim 1 wherein the insert includes a second axial facing surface that is adjacent to, but spaced from the plane of the unstressed fourth axial surface by a preselected axial distance; wherein the intersection of the planes of the second axial facing surface and the inwardly facing surface of the insert defines a second corner edge on the insert; wherein the inwardly facing surface of the insert is sloped radially outwardly, with respect to the longitudinal axis of the seal body, from the first corner edge; and wherein the fourth surface extends radially inwardly, from the second surface, a preselected radial distance that is less than the radial distance between the second surface and the second corner edge such that the second corner edge and at least a portion of the second axial surface of the insert are exposed.

11. The improved seal of claim 10 wherein the insert is made of PTFE material; wherein the seal body is made of rubber; wherein the seal body has a generally annular relief cavity opening in the first surface between the insert and the fifth lobe; and wherein the outwardly facing surface of the insert is parabolic in cross-sectional shape.

12. The improved seal of claim 11 wherein the radii of the first and second sealing lobes are generally the same; wherein the axial length of the central portion of the third lobe is approximately the length of the radii of the first and second sealing lobes; and wherein the truncated part of the fifth lobe faces the first sealing lobe.

13. The improved seal of claim 12 wherein the first corner edge of the insert is adjacent to the relief cavity wherein the radially inwardly facing surface of the insert is sloped radially inwardly, with respect to the longitudinal axis of the seal body, from the first corner edge; and wherein the relief cavity continues as a defined cavity when the seal is stressed due to the in use disposition of the seal.

14. The improved seal of claim 13 wherein first surface of the seal body is adapted to be disposed about and in sealing contact with a radially outwardly facing surface of the first member; wherein the second surface of the seal body is adapted to be disposed within and in sealing contact with a radially inwardly facing surface of the second member; wherein the radial dimension of the first surface of the seal body is less than the radial dimension of the radially outwardly facing surface of the first member and the radial dimension of the second surface of the seal body is greater than the radial dimension of the radially inwardly facing surface of the second member; and wherein the radial dimensions of the first and second surfaces of the seal body are selected so that when the seal is disposed between the radially outwardly facing surface of the first member and the radially inwardly facing surface of the second member, the induced forces in the seal body are mostly caused by the compression of the seal body between the first and second members.

15. The improved seal of claim 14 wherein the radii of the first and second sealing lobes are generally equal to or less than approximately 0.019 inches; wherein when unstressed, the third and fourth surfaces are generally perpendicular to the longitudinal axis; and wherein the second axial surface of the insert is substantially parallel with the unstressed fourth axial surface.

16. In a gas spring having an annularly spaced, axially relatively movable cylinder and piston rod, which gas spring contains relatively high pressure gas and lubricating oil, the improvement comprising a seal for sealing between the relatively movable cylinder and piston rod so as to minimize the leakage of the relatively high pressure gas and the lubricating oil out of the rod end of the gas spring, the seal having:

a generally annular seal body that is made of an elastomeric material, that has a longitudinal axis generally parallel to the axis of movement of the piston rod and cylinder, and that includes a first, radially inwardly facing surface, which is disposed about and in sealing contact with a radially outwardly facing surface on the piston rod of the gas spring; a second, radially outwardly facing surface, which is disposed within and in sealing contact with a radially inwardly facing surface on the cylinder of the gas spring; a third, axial surface, which is to be exposed to the relatively high pressure gas in the gas spring cylinder; and a fourth axial surface which is to be exposed to a relatively lower pressure;

the seal body having a generally annular recess opening in the first surface adjacent to the intersection of the planes of the first and fourth surfaces; and a relatively flowable plastic, generally annular insert disposed in the recess, with the insert having a central annular axis, having a radially outwardly facing surface which is generally convex in cross-sectional shape, having a first axial facing surface, having a radially inwardly facing surface and having a first corner edge, which is defined by the intersection of the planes of the first axial surface and the inwardly facing surface and which is disposed radially inwardly beyond the plane of the first surface of the seal body;

the seal body also having a first, generally annular sealing lobe, which is disposed at the intersection of the first and third surfaces; a second, generally annular sealing lobe, which is disposed at the intersection of the second and third surfaces; a third, generally annular enhanced force directing and sealing lobe, which has a preselected size and shape for inducing and directing a force in a preselected direction in the seal body when the seal body is disposed about and is in sealing contact with the radially outwardly facing surface on the piston rod and is disposed within and is in sealing contact with the radially inwardly facing surface on the cylinder and which is disposed adjacent to the intersection of the second and fourth surfaces; a fourth, generally annular enhanced forced directing and sealing lobe, which has a preselected size and shape for inducing and directing a force in a preselected direction in the seal body when the seal body is disposed about and in sealing contact with the radially outwardly facing surface on the piston rod and is disposed within and in sealing contact with the radially inwardly facing surface on the cylinder and which is disposed in the second surface between the second lobe and third lobe; and a fifth, generally annular wiper and sealing lobe in the first surface, which is disposed approximately midway between the planes of the third and fourth axial surfaces, with the first lobe and the fifth lobe projecting radially inwardly, and with the second lobe, the third lobe and the fourth lobe projecting radially outwardly;

the preselected size and shape of the third lobe and the fourth lobe, together with the compression of the seal between the cylinder and piston rod and the gas loading on the seal body, causing the seal body to rotate the insert, about the annular axis of the insert and to force the first corner edge of the insert to bear against the radially outwardly facing surface of the piston rod so as to minimize leakage of oil between the first corner edge and the radially outwardly facing surface of the piston rod.

17. The gas spring of claim 16 wherein the insert is made of PTFE material; and wherein the seal body is made of rubber.

18. The gas spring of claim 16 wherein the outwardly facing surface of the insert is parabolic in cross-sectional shape; and wherein the first corner edge of the insert is adjacent to the fifth lobe.

19. The gas spring of claim 16 wherein when unstressed, the third and fourth surfaces are generally non-concave.

20. The gas spring of claim 19 wherein when unstressed, the third and fourth surfaces are generally perpendicular to the longitudinal axis.

21. The gas spring of claim 16 wherein the fourth lobe is generally convex in cross-sectional shape when unstressed; wherein the fifth lobe is generally convex in cross-sectional shape, although truncated in part in one axial direction when unstressed; and wherein the third lobe is generally convex in cross-sectional shape although having an extended central portion when unstressed.

22. The gas spring of claim 21 wherein the first and second sealing lobes are generally convex in cross-sectional shape, when unstressed; wherein the radii of the first and second sealing lobes are generally the same; wherein the radius of the fourth lobe is approximately twice that of the radii of the first and second sealing lobes; and wherein the axial length of the central portion of the third lobe is approximately the length of the radii of the first and second sealing lobes.

23. The gas spring of claim 22 wherein the radii of the first and second sealing lobes are generally equal to or less than approximately 0.019 inches; and wherein the plane of the inwardly facing surface of the insert is sloped radially outwardly, with respect to the longitudinal axis of the seal body, from the first corner edge.

24. The gas spring of claim 22 wherein the truncated part of the fifth lobe is adjacent to the first sealing lobe.

25. The gas spring of claim 16 wherein the seal body has a generally annular relief cavity opening in the first surface between the insert and the fifth lobe.

26. The gas spring of claim 25 wherein the relief cavity continues as a defined cavity when the seal is stressed due to in-use disposition of the seal, under compression, between the cylinder and the piston rod.

27. The improved seal of claim 16 wherein the radial dimension of the first surface of the seal body is less than the radial dimension of the radially outwardly facing surface of the piston rod and the radial dimension of the second surface of the seal body is greater than the radial dimension of the radially inwardly facing surface of the cylinder; and wherein the radial dimensions of the first and surfaces of the seal body are selected so that when the seal is disposed between the radially outwardly facing surface of the piston rod and the radially inwardly facing surface of the cylinder, the induced forces in the seal body are mostly caused by the compression of the seal body between the piston rod and cylinder.

28. The gas spring of claim 16 wherein the insert includes a second axial facing surface that is adjacent to, but spaced from the plane of the unstressed fourth axial surface by a preselected axial distance; wherein the intersection of the planes of the second axial facing surface and the inwardly facing surface of the insert defines a second corner edge on the insert; wherein the inwardly facing surface of the insert is sloped radially outwardly, with respect to the longitudinal axis of the seal body, from the first corner edge; wherein the fourth surface extends radially inwardly, from the second surface, a preselected radial distance that is less than the radial distance between the second surface and the second corner edge such that the second corner edge and at least a portion of the second axial surface of the insert are exposed.

29. The gas spring of claim 28 wherein the outwardly facing surface of the insert is parabolic in cross-sectional shape; wherein the insert is made of PTFE material; and wherein the first corner edge of the insert is adjacent to the fifth lobe.

30. The gas spring of claim 29 wherein the fourth lobe is generally convex in cross-sectional shape when unstressed; wherein the fifth lobe is generally convex in cross-sectional shape, although truncated in part in one axial direction when unstressed; wherein the third lobe is generally convex in cross-sectional shape although having an extended central portion when unstressed.

31. The gas spring of claim 30 wherein the first and second sealing lobes are generally convex in cross-sectional shape, when unstressed; wherein the radii of the first and second sealing lobes are generally the same; wherein the radius of the fourth lobes is approximately twice that of the radii of the first and second sealing lobes; and wherein the axial length of the central portion of the third lobe is approximately the length of the radii of the first and second sealing lobes.

32. The gas spring of claim 31 wherein the seal body has a generally annular relief cavity opening in the first surface between the insert and the fifth lobe.

33. The gas spring of claim 32 wherein the radial dimension of the first surface of the seal body is less than the radial dimension of the radially outwardly facing surface of the piston rod and the radial dimension of the second surface of the seal body is greater than the radial dimension of the radially inwardly facing surface of the cylinder; and wherein the radial dimensions of the first and second surfaces of the seal body are selected so that when the seal is disposed between the radially outwardly facing surface of the piston rod and the radially inwardly facing surface of the cylinder, the induced forces in the seal body are mostly caused by the compression of the seal body between the cylinder and the piston rod.

34. The gas spring of claim 33 wherein the truncated part of the fifth lobe is adjacent to the first sealing lobe; and wherein the relief cavity continues as a defined cavity when the seal is stressed due to the in-use disposition of the seal, under compression, between the cylinder and the piston rod.

35. The gas spring of claim 34 wherein the radii of the first and second sealing lobes are equal to or less than approximately 0.019 inches; wherein the seal body is made of rubber; wherein when unstressed, the third and fourth surfaces are generally non-concave and are generally perpendicular to the longitudinal axis; and wherein the second axial surface of the insert is substantially parallel with the unstressed fourth axial surface.

36. An improved seal for minimizing the leakage of relatively high pressure gas and lubricating oil between a first inner rod member and a second outer cylindrical member, which members are annularly spaced and are relatively movable with respect to each other, the improved seal comprising:

a generally annular seal body that is made of an elastomeric material, that has a longitudinal axis generally parallel to the axis of movement of the rod and cylindrical members, and that includes a first, radially inwardly facing surface, which is adapted to be disposed about and in sealing contact with a radially outwardly facing surface of the rod member; a second, radially outwardly facing surface, which is adapted to be disposed within and in sealing contact with a radially inwardly facing surface of the cylindrical member; a third, axial surface, which is to be exposed to the relatively high pressure gas; and a fourth axial surface, which is to be exposed to a relatively lower pressure;

the seal body having a generally annular recess opening in the first surface adjacent to the intersection of the planes of the first and fourth surfaces; and a relatively flowable plastic, generally annular insert disposed in the recess, with the insert having a central annular axis, having a radially outwardly facing surface which is generally convex in cross-sectional shape, having a first axial facing surface, having a radially inwardly facing surface and having a first corner edge, which is defined by the intersection of the planes of the first axial surface and the inwardly facing surface of the insert and which is disposed radially inwardly beyond the plane of the first surface of the seal body;

the seal body also having a first, generally annular sealing lobe, which is disposed at the intersection of the first and third surfaces; a second, generally annular sealing lobe, which is disposed at the intersection of the second and third surfaces; a third, generally annular enhanced force directing and sealing lobe, which has a preselected size and shape for inducing and directing a force in a preselected direction in the seal body when the seal body is disposed about and in sealing contact with the radially outwardly facing surface on the piston rod and is disposed within and in sealing contact with the radially inwardly facing surface on the cylinder and which is disposed adjacent to the intersection of the second and fourth surfaces; a fourth, generally annular enhanced forced directing and sealing lobe, which has a preselected size and shape for inducing and directing a force in a preselected direction in the seal body when the seal body is disposed about and in sealing contact with the radially outwardly facing surface on the piston rod and is disposed within and in sealing contact with the radially inwardly facing surface on the cylinder and which is disposed in the second surface between the second lobe and third lobe; and a fifth, generally annular wiper and sealing lobe in the first surface, which is disposed approximately midway between the planes of the third and fourth axial surfaces, with the first lobe and the fifth lobe projecting radially inwardly, and with the second lobe, the third lobe and the fourth lobe protecting radially outwardly;

the preselected size and shape of the third lobe and the fourth lobe, together with the compression of the seal between the cylinder and piston rod, causing the seal body to rotate the insert, about the annular axis of the insert, and to force the first corner edge of the insert to bear against the radially outwardly facing surface of the rod member so as to minimize the leakage of oil between the first corner edge and the radially outwardly facing surface of the rod member.

37. The seal of claim 36 wherein the insert is made of PTFE material; and wherein the seal body is made of rubber.

38. The seal of claim 36 wherein the outwardly facing surface of the insert is parabolic in cross-sectional shape; and wherein the first corner edge of the insert is adjacent to the fifth lobe.

39. The seal of claim 36 wherein when unstressed, the third and fourth surfaces are generally non-concave.

40. The seal of claim 39 wherein when unstressed, the third and fourth surfaces are generally perpendicular to the longitudinal axis.

41. The seal of claim 36 wherein the fourth lobe is generally convex in cross-sectional shape when unstressed; wherein the fifth lobe is generally convex in cross-sectional shape, although truncated in part in one axial direction when unstressed; and wherein the third lobe is generally convex in cross-sectional shape although having an extended central portion when unstressed.

42. The seal of claim 41 wherein the first and second sealing lobes are generally convex in cross-sectional shape, when unstressed; wherein the radii of the first and second sealing lobe are generally the same; wherein the radius of the fourth lobe is approximately twice that of the radii of the first and second sealing lobes; and wherein the axial length of the central portion of the third lobe is approximately the length of the radii of the first and second sealing lobe.

43. The seal of claim 42 wherein the radii of the first and second sealing lobes are generally equal to or less than approximately 0.019 inches; and wherein the plane of the inwardly facing surface of the insert is sloped radially outwardly, with respect to the longitudinal axis of the seal body, from the first corner edge.

44. The seal of claim 42 wherein the truncated part of the fifth lobe is adjacent to the first sealing lobes.

45. The seal of claim 36 wherein the seal body has a generally annular relief cavity opening in the first surface between the insert and the fifth lobe mean.

46. The seal of claim 45 wherein the relief cavity continues as a defined cavity when the seal is stressed due to the in-use disposition of the seal, under compression, between the cylindrical member and the rod member.

47. The seal of claim 36 wherein the radial dimension of the first surface of the seal body is less than the radial dimension of the radially outwardly facing surface of the rod member and the radial dimension of the second surface of the seal body is greater than the radial dimension of the radially inwardly facing surface of the cylinder member; and wherein the radial dimensions of the first and second surfaces of the seal body are selected so that when the seal is disposed between the radially outwardly facing surface of the rod member and the radially inwardly facing surface of the cylinder member, the induced forces in the seal body are mostly caused by the compression of the seal body between the cylindrical member and the rod member.

48. The seal of claim 36 wherein the insert includes a second axial facing surface that is adjacent to, but spaced from the plane of the unstressed fourth axial surface by a preselected axial distance; wherein the intersection of the planes of the second axial facing surface and the inwardly facing surface of the insert defines a second corner edge on the insert; wherein the fourth surface extends radially inwardly, from the second surface, a preselected radial distance that is less than the radial distance between the second surface and the second corner edge such that the second corner edge and at least a portion of the second axial surface of the insert are exposed.

49. The seal of claim 48 wherein the outwardly facing surface of the insert is parabolic in cross-sectional shape; wherein the insert is made of PTFE material; wherein the inwardly facing surface of the insert is sloped radially outwardly, with respect to the longitudinal axis of the seal body, from the first corner edge; and wherein the first corner edge of the insert is adjacent to the fifth lobe.

50. The seal of claim 49 wherein the fourth lobe is generally convex in cross-sectional shape when unstressed; wherein the fifth lobe is generally convex in cross-sectional shape, although truncated in part in one axial direction when unstressed; wherein the third lobe is generally convex in cross-sectional shape although having an extended central portion when unstressed.

51. The seal of claim 50 wherein the first and second sealing lobes are generally convex in cross-sectional shape, when unstressed; wherein the radii of the first and second sealing lobes are generally the same; wherein the radius of the fourth lobes is approximately twice that of the radii of the first and second sealing lobes; and wherein the axial length of the central portion of the third lobe is approximately the length of the radii of the first and second sealing lobes.

52. The seal of claim 51 wherein the seal body has a generally annular relief cavity opening in the first surface between the insert and the fifth lobe.

53. The seal of claim 52 wherein the radial dimension of the first surface of the seal body is less than the radial dimension of the radially outwardly facing surface of the rod member and the radial dimension of the second surface of the seal body is greater than the radial dimension of the radially inwardly facing surface of the cylinder member; and wherein the radial dimensions of the first and second surfaces of the seal body are selected so that when the seal is disposed between the radially outwardly facing surface of the rod member and the radially inwardly facing surface of the cylinder member, the induced forces in the seal body are mostly caused by the compression of the seal body between the cylindrical member and the rod member.

54. The seal of claim 53 wherein the truncated part of the fifth lobe is adjacent to the first sealing lobe; and wherein the relief cavity continues as a defined cavity when the seal is stressed due to the in use disposition of the seal, under compression, between the cylindrical member and the rod member.

55. The seal of claim 54 wherein the radii of the first and second sealing lobes are generally equal to or less than approximately 0.019 inches; wherein the seal body is made of rubber; wherein when unstressed, the third and fourth surfaces are generally non-concave and are generally perpendicular to the longitudinal axis; and wherein the second axial surface of the insert is substantially parallel with the unstressed fourth axial surface.

* * * * *